(12) United States Patent
Redl (10) Patent No.: US 9,029,738 B2
(45) Date of Patent: May 12, 2015

(54) PORTABLE CONTAINER HEATING SYSTEM

(75) Inventor: Arnost Redl, Tisnov (CZ)

(73) Assignee: VP Okna, S.R.O., Kurim (CZ)

( * ) Notice: Subject to any disclaimer, the term of this patent is extended or adjusted under 35 U.S.C. 154(b) by 444 days.

(21) Appl. No.: 13/010,695

(22) Filed: Jan. 20, 2011

(65) Prior Publication Data

US 2012/0187066 A1    Jul. 26, 2012

(51) Int. Cl.
| | | |
|---|---|---|
| A47J 36/24 | (2006.01) | |
| A47J 41/00 | (2006.01) | |
| A61J 9/00 | (2006.01) | |
| B65D 25/04 | (2006.01) | |
| B65D 47/20 | (2006.01) | |
| B65D 47/26 | (2006.01) | |
| A61J 9/02 | (2006.01) | |

(52) U.S. Cl.
CPC .......... *A47J 41/0038* (2013.01); *A47J 36/2433* (2013.01); *A61J 9/00* (2013.01); *A61J 2200/42* (2013.01); *B65D 25/04* (2013.01); *B65D 47/2031* (2013.01); *B65D 47/265* (2013.01); *A61J 9/003* (2013.01); *A61J 9/02* (2013.01)

(58) Field of Classification Search
None
See application file for complete search history.

(56) References Cited

U.S. PATENT DOCUMENTS

| | | | | |
|---|---|---|---|---|
| 3,231,716 | A * | 1/1966 | van den Bosch | 219/433 |
| 3,247,360 | A * | 4/1966 | Ponder | 219/436 |
| 3,423,571 | A * | 1/1969 | Trachtenberg et al. | 219/441 |
| 3,705,661 | A * | 12/1972 | Davis | 215/6 |
| 3,876,112 | A * | 4/1975 | Kramer | 222/132 |
| 3,931,494 | A * | 1/1976 | Fisher et al. | 219/441 |
| 4,801,782 | A * | 1/1989 | Ineson | 219/438 |
| 5,060,811 | A * | 10/1991 | Fox | 215/6 |
| 5,208,896 | A * | 5/1993 | Katayev | 392/444 |
| 5,588,550 | A * | 12/1996 | Meyer | 220/525 |
| 5,593,052 | A * | 1/1997 | McGee | 215/11.1 |
| 5,758,786 | A * | 6/1998 | John | 215/6 |
| 5,890,627 | A * | 4/1999 | Storey | 222/129 |
| 5,921,440 | A * | 7/1999 | Maines | 222/145.2 |
| 5,938,053 | A * | 8/1999 | Verbovszky et al. | 215/6 |
| 6,072,161 | A * | 6/2000 | Stein | 219/432 |
| 6,204,485 | B1 * | 3/2001 | Williams | 219/429 |
| 6,450,351 | B1 * | 9/2002 | Thompson | 215/6 |
| 6,639,186 | B1 * | 10/2003 | Perez | 219/387 |
| 6,877,638 | B2 * | 4/2005 | Chan et al. | 222/145.3 |
| 7,022,946 | B2 * | 4/2006 | Sanoner et al. | 219/387 |
| 8,328,044 | B1 * | 12/2012 | Iskandar | 220/713 |
| 2006/0081599 | A1 * | 4/2006 | Anderson | 219/438 |
| 2009/0127263 | A1 * | 5/2009 | Hylton | 220/507 |
| 2010/0147888 | A1 * | 6/2010 | Gold | 222/144 |
| 2011/0132893 | A1 * | 6/2011 | Lin et al. | 219/441 |
| 2013/0001111 | A1 * | 1/2013 | Knutsen | 206/222 |
| 2013/0001233 | A1 * | 1/2013 | Hylton | 220/592.2 |

* cited by examiner

*Primary Examiner* — Joseph M Pelham
(74) *Attorney, Agent, or Firm* — Holland & Hart LLP (57) ABSTRACT

A bottle includes at least one internal compartment delimited with a bottle casing. The bottle body has at least one filling and/or outlet hole, arranged parallel to the bottle's longitudinal axis, fitted with at least one removable cap. The internal part of the bottle is fitted with at least one heating device connected to a thermal source and/or one partition dividing the internal space of the bottle to at least two mutually separated compartments connected to the filling and/or outlet hole.

20 Claims, 6 Drawing Sheets

PORTABLE CONTAINER HEATING SYSTEM

BACKGROUND

Technology Application Scope

The technical solution is designed especially for containers for liquids, usually having the shape of a cylindrical bottle, with at least one filling and/or outlet hole fitted with a cap, such as the nursing bottle.

Existing Level of the Technology Development

Existing containers, especially containers for liquids, for example nursing bottles, usually comprise just one compartment so they may be used for storing, carrying and serving only one type of contents, for example milk, tea or water. Such and similar containers are generally not fitted with any device for warming the content, which means that the content temperature quickly levels off with the ambient temperature. As a result, the temperature of a warmed drink is not stable and the drink gets cold fast. Fitting a bottle with a heat insulating sleeve is not a satisfactory solution either.

When it is necessary to have more than one drink available at the same time, one has to have and transport (if required) a corresponding number of bottles, which is inconvenient and demands transportation space and investments as more bottles have to be purchased.

If the bottle contents temperature has to be maintained at a required level, the bottle needs to be kept in a thermally insulating environment, e.g. in a thermally insulating sleeve. It is also difficult and uncomfortable to warm or reheat bottle contents so as to reach the required temperature. The temperature of the contents is usually determined or checked only approximately by touching the contents with a hand, putting the bottle to a cheek or by tasting the contents, which is rather unhygienic and subjective. Determining temperature in this manner is very inaccurate and subjective. Moreover, any incorrect estimation of the bottle contents temperature may cause damage to a consumer's (child's) health. It is thus difficult, or impossible to warm a drink in a bottle to a required temperature when traveling away from home.

SUMMARY

The new technical solution provided in several embodiments herein, to a considerable extent, eliminates the above mentioned deficiencies, especially as regards containers used for liquids, usually of a cylindrical shape, with at least one filling and/or outlet hole fitted with a cap, such as, for example, the nursing bottle. The principle of the new technical solution lies in a bottle comprising at least one internal compartment delimited with the bottle casing. The bottle body has at least one filling and/or outlet hole, arranged parallel to the bottle's longitudinal axis, fitted with at least one removable cap; the internal part of the bottle is fitted with at least one heating device connected to a thermal source and/or one partition dividing the internal space of the bottle to at least two mutually separated compartments connected to at least one filling and/or outlet hole.

A bottle designed on the basis of this technical solution enables a user to store and transport more than one type of liquid or powder-form substances, such as for example instant powder drinks or instant powder mixes, or a combination of loose materials and liquids, and to select the type that will be released from a bottle, or directly consumed from it. Bottle contents may be warmed at a required temperature as need be, anytime and anywhere, and independently of whether a thermal source is or is not available because such a bottle is fitted with its own autonomous warming device installed in the bottle, such as for example an electric heater connected to an electric accumulator. Any car accumulator or an adapter connected to network voltage may also serve as a power supply device.

This is convenient especially regarding nursing bottles designed according to this technical solution as such bottles enable a child to be gradually fed with more types of food meeting child's needs, e.g. milk or any type of drink such as tea or water, while providing and maintaining a required temperature even throughout a long walk or journey. One single bottle is capable of providing all these functions.

A bottle's removable thermal source enables disconnection from a heater after a required temperature of bottle content has been reached.

The electric accumulator is a mobile, easily available, detachable and controllable source of electric energy that may be easily connected to a charging device enabling the accumulator to be repeatedly recharged as necessary.

The switchgear arranged in a circuit between the electric accumulator and the electric heater and/or between the electric accumulator and the charging device enables disconnecting the heater or the accumulator from electricity supply source at any time, easily and as necessary. The constructional design connecting the electric accumulator and the switchgear and/or the charging device to the cap of the inlet and/or outlet hole creates a compact and easily manageable unit.

Sufficiently accurate data on the temperature in a respective compartment of a bottle are provided by means of a temperature detector, installed in at least one compartment and connected to a temperature indicator, monitoring the compartment environment.

The size of the temperature indicator is small, it is easily available, quite cheap and shock-proof and it may be easily installed in any container. Its numerical scale enables easy and fast reading of the indicated temperature.

The partition is water-proof and it separates individual compartments of the bottle, as well as their contents, in a watertight manner, which is required especially with respect to liquid fillings. The water-proof cap of the inlet and/or outlet hole closes the whole compartment or the whole bottle in a watertight manner, thus enabling to handle the bottle more easily, even when the bottle is filled with liquid.

The partition is designed to have a flat length-profile, the peripheral surface of which fits tightly to the abutting walls of a bottle or to the abutting walls of the grooves made in the abutting walls of a bottle; it is a simple device for creating more sections in the bottle, which concurrently separates them from each other. Its production is easy.

Partitions that are designed as a compact unit with abutting walls make a compact unit, with individual bottle compartments perfectly separated from each other in a watertight manner. Production of this version is also easy.

The partition designed to have a shape of a plate is a simple way of crating two mutually separated compartments of a bottle. Its production is cheap and easy.

The partition designed in the V-shape creates three mutually separated compartments in a bottle.

The partition designed in the Y-letter shape enables to create three symmetric, mutually separated compartments in quite an easy manner.

The partition having the shape of a hollow roll installed inside a bottle may be produced easily and enables two compartments to be created in a bottle. When the liquid inside the hollow roll is warmed up, the heat loss may be used to warm the liquid outside the partition. The compartment outside the hollow roll also operates as an insulating layer reducing loss heat dissipation from the compartment inside the hollow roll. The coaxial arrangement of the inner layer of a bottle and the hollow roll makes a symmetric unit of a bottle with a thermal insulating layer symmetrically laid out around the compartment inside the partition having the shape of a hollow roll. Individual compartments of the bottle are separated by fitting the bottom part of the hollow roll tightly to the abutting walls of the bottle and/or to the abutting walls of the grooves made in the abutting walls of a bottle. The fitting of the bottom part of the hollow roll to the walls turns a bottle into a compact, solid, mechanically steady unit, which may be produced by one moulding operation; it reduces the number of assembly parts and production moulds, while securing perfect and water-proof separation of individual compartments of a bottle.

The screw joint is a common and reliable system for joining a cap of the inlet and/or outlet hole with a bottle, its production is easy.

Fitting the periphery of a cap and/or the periphery of the inlet and/or outlet hole of a bottle with a screw thread only in determined sections is easier, more economic and cheaper as regards its production. It also makes handling the bottle cap easier and faster. To close the bottle, it is sufficient to turn the cap through only a part of the periphery of a circle, i.e. an angle smaller than 180°.

A plate closure with its bottom surface abutting tightly on the top surface of the inlet holes, fitted with at least one hole located above at least one compartment, while a sealing disc, which may be adjusted by being rotated along its longitudinal axis, abuts tightly on the top surface of the plate closure and is fitted with at least one hole overlapping, at least partially, with at least one hole in the plate closure, while at least the annulated part of the removable cap surface abuts on the top surface of the sealing disc, is a simple system for closing at least some of the inlet and/or outlet holes, while positioning of the plate closure hole above the respective compartment of a bottle is a simple method how to connect the respective compartment with an inlet and/or outlet hole.

The design of the plate closure in the shape of a circle sector, the lateral sides of which form an angle less than 180°, and where the central part of the circle sector is on a circle with a diameter less that the thickness of the partition wall, enables creating the biggest possible cross-section of the inlet and/or outlet hole in the plate closure.

A tight connection of the partition to the other parts of a bottle, a more fixed position of the partition and more reliable separation of individual compartments of a bottle may be reached by fitting the plate closure with a dimple on its side close to the bottle and/or with projections making up a slot which the upper part of the partition fits in.

The water-proof fixing of the partition in the slot of the abutting surface of the plate closure contributes to the water-proof closing of individual compartments of a bottle.

The sealing disc designed in the same shape as is the shape of the plate closure makes their production, assembly and bottle handling easier, especially as regards connecting individual compartments above the inlet and/or outlet hole.

The design of the removable cap in the shape of a cap nut, with its female thread engaged with the thread made on the abutting top peripheral surface of a bottle, while the annulated surface of the bottom part of a dummy, the top part of which goes through the hole in the removable cap, abuts on the bottom surface of the sealing disc, enables the removable cap to be easily connected with the bottle and the bottle to be closed in an easy, firm and tight manner. It also ensures that the dummy is sealed off in a necessary manner and fixed to the outlet hole of a bottle.

The arresting projection and the dimple fitting into it that are made on the internal wall of the removable cap and the abutting part of the plate closure and/or sealing disc secure the mutual positioning of these parts.

Connecting the heater to a bearing disc makes assembly of the heater into a bottle, or any of its compartments, and sealing off the bottle hole, through which the heater is inserted into the bottle, easier.

The bearing disc is made of a material which secures electric insulation and so it insulates the heater or its leading-in wires from the other parts of the bottle.

Two electric contacts on the side of the bearing disc opposing the side with the electric heater enable connecting electric heater to a power supply source. The electric contacts are designed in the shape of two flat concentric rings which enable them to be connected to an electric accumulator when the bottle and the removable cap are interconnected by means of a screw line.

The bottle may be made of glass, metal or plastic, or a plied combination of at least two such materials. This available selection enables to choose the most suitable material with respect to the type(s) of the contents planned to be filled in a bottle and with respect to the expected purpose which the bottle is to be used for. Glass is preferred as the most suitable material for nursing bottles, especially due to its harmlessness to health, fastness and resistance against chemical reactions (if any) with contents of a bottle but also as regards hygiene and cleaning of a bottle. As compared to this, the advantage of plastic is its higher resiliency to fragmenting destruction, reducing the possibility of an injury to a bottle user. The material preferred for any bottles that are required to be more resistant against mechanical impacts, for example those intended to be used in the field under difficult conditions, e.g. for backpackers, units of the integrated rescue system, fire-brigades, the police, ambulance services; flasks for the army, etc, will be metal, or its combination with any other of the above specified materials.

The thermostat installed in at least one compartment of a bottle, which is interconnected with the electric switchgear in the circuit of the electricity power supplied to the heater, ensures that the power supply source is disconnected from the heater when a required temperature of contents of a bottle has been reached. The thermostat with an adjustable temperature level for switching the device on or off enables to select the required temperature to which the contents of a bottle are to be warmed.

When at least one part of the partition or the casing of a bottle are made as thermally insulating walls, it shall eliminate any mutual transfer of heat between individual compartments of a bottle, and subsequently reduce heat loss resulting from transfer of heat in the inner space of a bottle via its surface to the surrounding environment. It keeps liquids in a bottle at a required temperature for a longer time, without any need to additionally warm a bottle up. The porous version of the inner part of the partition's cross-section furthermore contributes to the elimination of heat transfer between individual compartments of a bottle. A similar effect is reached when the partition is made as a doubled-wall, while the space between the walls of the partition is filled with gas. The heat conductivity of gas between the walls of the partition that is lower than the heat conductivity of air, or evacuation of the space between the walls of the partition furthermore reduces the heat conductivity.

The bottle casing formed by two walls, with an airtight space between them, reduces loss heat dissipating from inside of a bottle to its surrounding environment. The loss heat dissipation is further reduced by filling the space between the casing walls with gas whose thermal conductivity is less that the thermal conductivity of air, and/or by evacuating the space.

The thermal resistance of inner walls of the bottle and/or the partition is also increased when at least one wall is coated with a metal layer with polished finish, which also contributes to reducing heat loss dissipating from the bottle to its surrounding environment, and subsequently to maintaining required temperature of liquids in a bottle for a longer period of time. The effect of heat loss reduction by providing respective surfaces of a bottle with a polished metal layer may be achieved in an efficient and reliable manner when metal layers have been vacuum deposited on respective surfaces.

BRIEF SUMMARY OF THE DRAWINGS

The technical solution of an exemplary embodiment is clarified with drawings presenting: the nursing bottle with a partition, in which.

DETAILED DESCRIPTION

Figure 1:
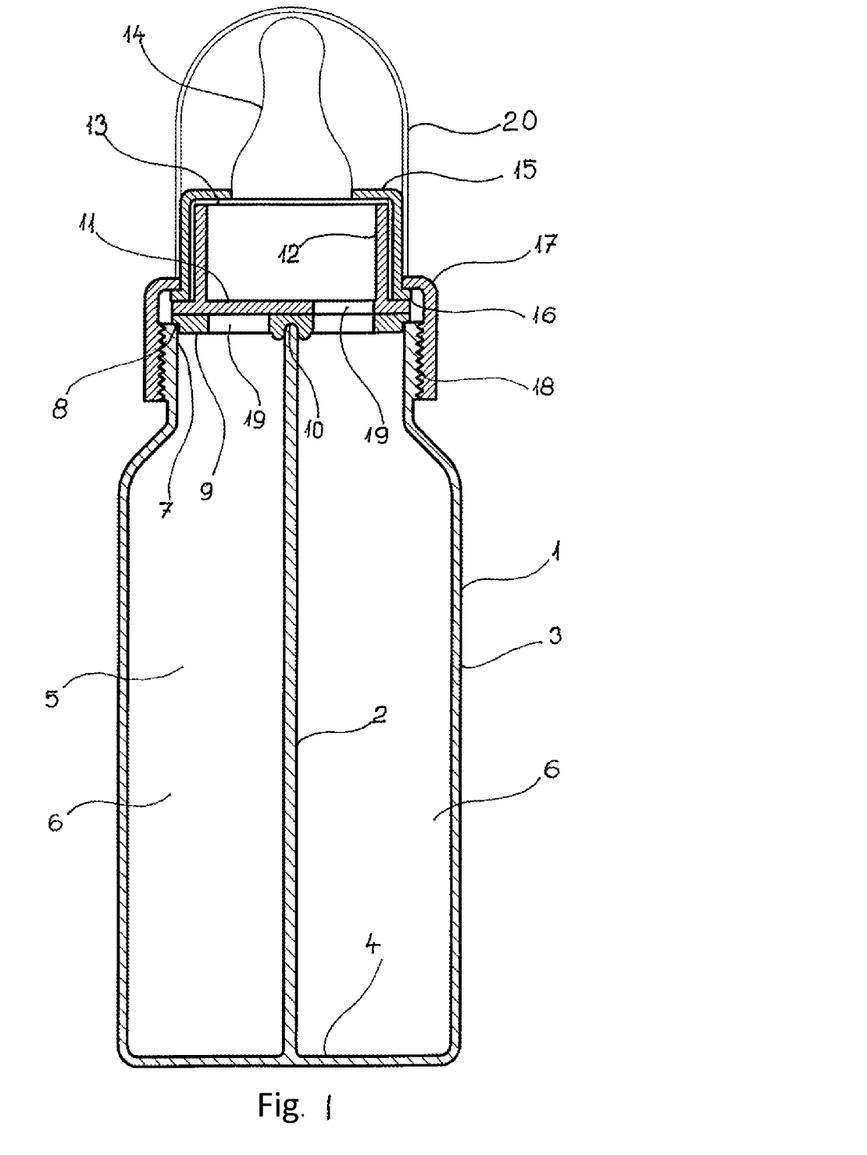
FIG. 1 is a front elevation view, partially in cross-section, of a nursing bottle of an exemplary embodiment of the disclosure.

The nursing bottle 1 in FIG. 1 has one partition 2 in the form of a flat length-profile arranged inside, making one unit together with the casing 3 and the bottom 4 of the nursing bottle 1. The partition divides the inner space 5 of the nursing bottle 1 to two mutually separated watertight compartments. The mounting system 8 of the plate closure 9, with a circumferential groove 10 made in its inner side which the upper part of the partition 2 is fit into in a watertight manner, tightly abuts on the nursing bottle neck 7. The sealing disc 11 is adjusted to the upper surface of the plate closure 9. The upper part of the sealing disc 11 is extended with a cylindrical superstructure 12. The bottom surface of the collar 13 of the dummy 14 that is forced down from above by the abutting wall of the removable cap 15, abuts on the upper part of the sealing disc 11. The mounting system 16 on the bottom of the removable cap 15 is forced down to the sealing disc 11 by the cap nut 17 that is connected to the neck 7 by means of a screwed joint 18. Holes 19, that are of the same shape and are mutually adjustable, are made in the plate closure 9 and the sealing disc 11. The dummy 14 is provided with a protective cover 20.

Figure 2:
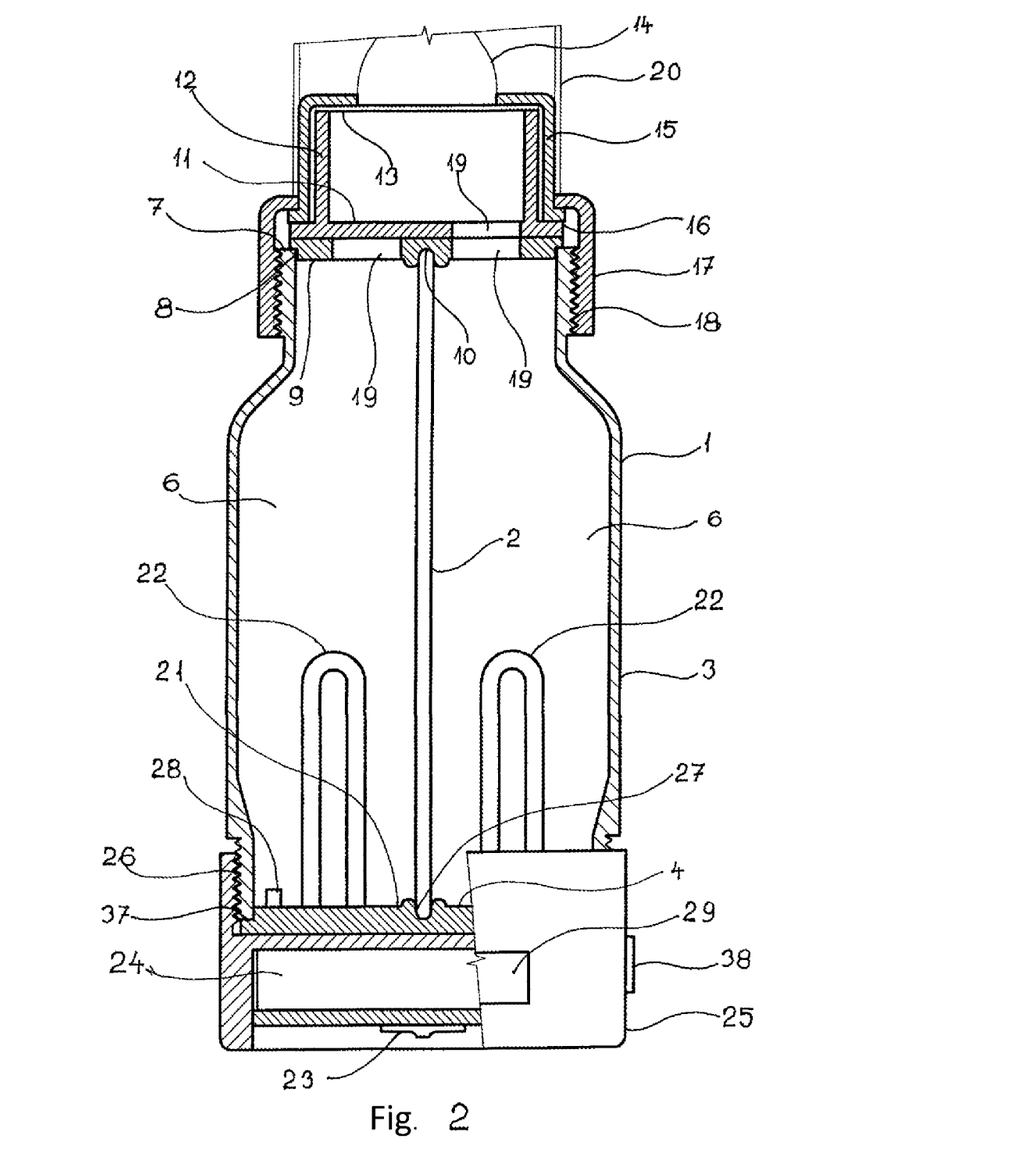
FIG. 2 is a cross-section view of the nursing bottle with a partition and two electric heaters.

The nursing bottle 1 bottom 4 in FIG. 2 is comprised of the bearing disc 21 with two electric heaters 22 installed on it, one in each compartment 6 of the nursing bottle 1, connected to the electric accumulator 24 via a switchgear 23 arranged in the bottom cap 25 that is forced to the casing 3 by the bearing disc 21 and connected to the casing 3 by means of the bottom screwed joint 26. The bottom part of the partition 2 fits to the longitudinal dimple 27 of the bearing disc 21 in a watertight manner. The secondary mounting system 37 of the bearing disc 21 abuts on the abutting walls of the bottom part of the casing 3 in a watertight manner. The temperature detectors 28 are installed on the bearing disc 21. They are connected to the digital temperature indicator 29 that is installed on the bottom cap 25. The electric plug 38 for the connecting of the heaters 22 and/or the electric accumulator 24 to the power supply source is arranged on the side wall of the bottom cap 25.

The upper part of the nursing bottle 1 in FIG. 2 is of the same design as the upper part of the nursing bottle 1 showed in FIG. 1.

Figure 3:
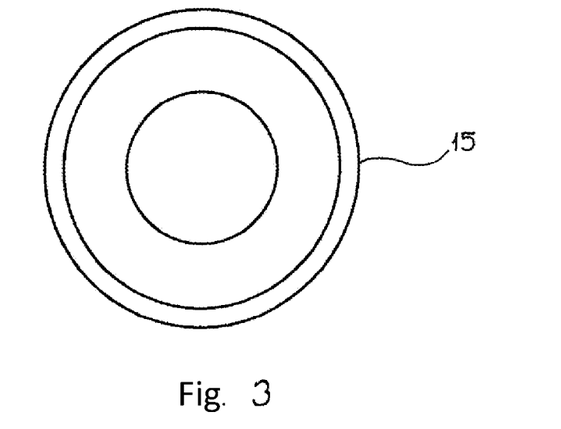
FIG. 3 is a top view of the removable cap.
Figure 4:
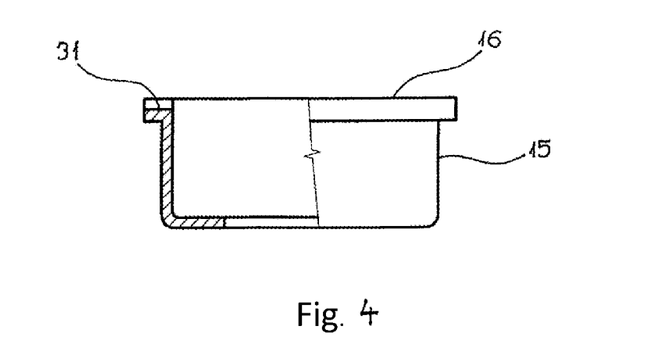
FIG. 4 is a front view of the removable cap, partially in cross-section.

The local view of the removable cap 15 in FIGS. 3 and 4 shows two arresting dimples 31, mutually dislocated by 180°, made in the bottom mounting system 16 of the removable cap 15.

Figure 5:
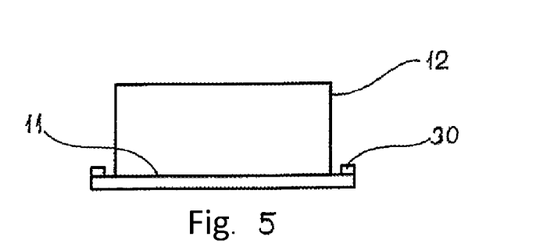
FIGS. 5 and 6 show details of a sealing disc of an embodiment.
Figure 6:
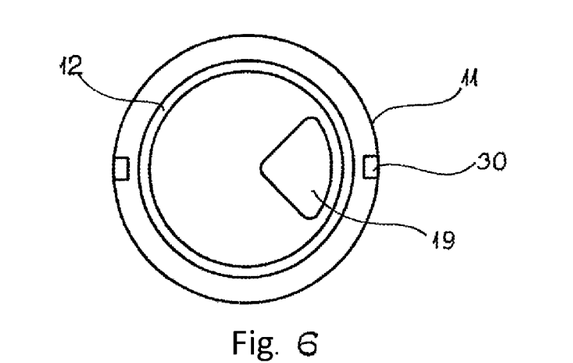

The sealing disc 11 in FIGS. 5 and 6 has one hole 19 made in it in the shape of a circle sector, and two arresting projections 30 made in the circumference on the upper surface; they are mutually dislocated by 180° along the circumference. They are designed to get engaged with the arresting dimples 31 of the removable cap 15. This part of the sealing disc 11 extends into the cylindrical superstructure 12.

Figure 7:
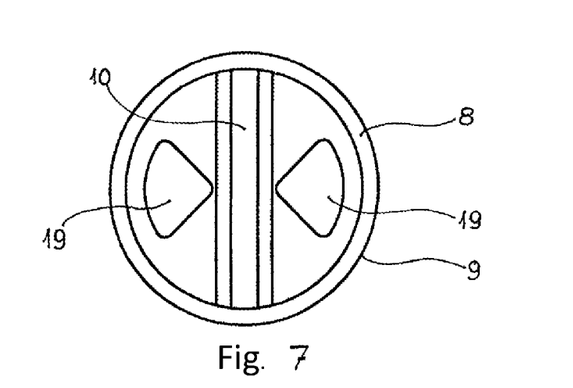
FIG. 7 is a top view if a plate closure of an embodiment.
Figure 8:
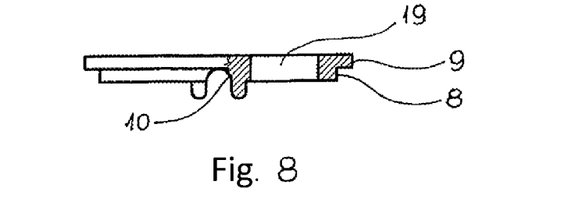
FIG. 8 is a front view of a plate closure, partially in cross-section, of an embodiment.

The plate closure 9 in FIGS. 6 and 7 has the mounting system 8 made all round and two holes 19 having the shape of a circle sector arranged to face one another. It has a longitudinal groove 10 made in its bottom part which is comprised both of circumferential dimples and circumferential projections.

Figure 9:
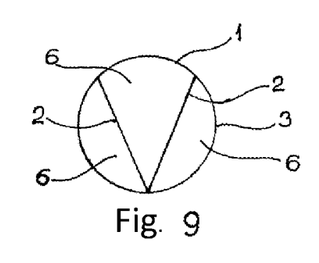
FIGS. 9 and 10 show schematic views of the arrangement of the partitions in the V-letter and Y-letter shapes according to exemplary embodiments.
Figure 10:
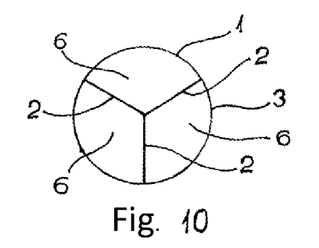

The partitions 2 designed in the shape of V-letter and Y-letter in FIGS. 9 and 10 are connected to the casing 3 of the nursing bottle 1, separating it into three compartments 6 that are mutually separated in a watertight manner.

Figure 11:
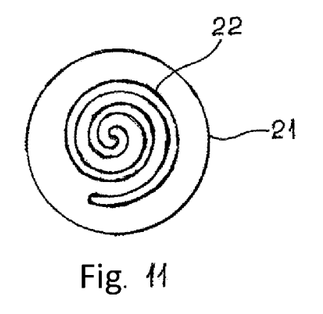
FIG. 11 is a top view of an electric heater with the bearing disc according to an embodiment.

The bearing disc 21 in FIG. 11 is connected to the electric heater 22 and is of spiral shape.

Figure 12:
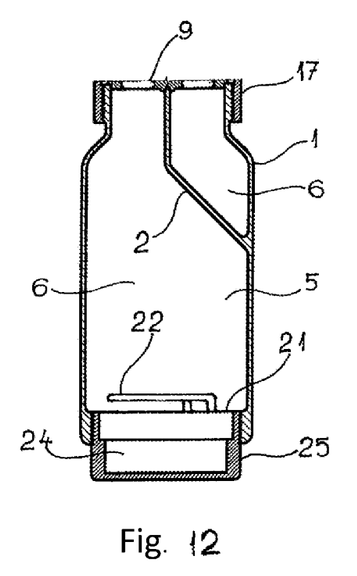
FIGS. 12 and 13 show exemplary embodiments of nursing bottles, in cross-section, with two arrangements of partitions and electric heaters.

The nursing bottle 1 in FIG. 12 has its inner space 5 divided by the partition 2 to two compartments 6 of considerably different volumes. The electric accumulator 24 is arranged in the bottom cap 25. Above it, there is the bearing disc 21 with the electric heater 22 installed in one compartment 6 only. A part of the plate closure 9 and the cap nut 17 is showed in the upper part of the nursing bottle 1.

Figure 13:
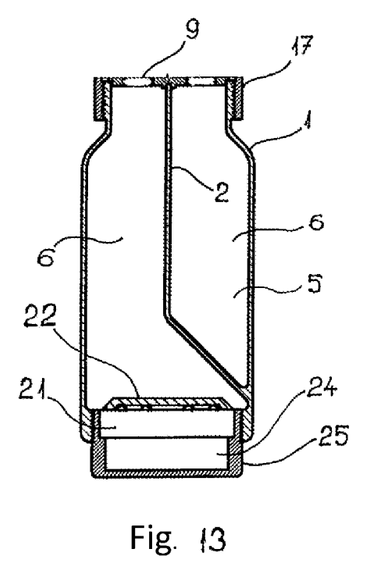

The electric heater 22 of the nursing bottle 1 in FIG. 13 is in the shape of a flat disc and is connected to the bearing disc 21. The partition 2 divides the inner space 5 to two asymmetric compartments 6. The electric accumulator 21 is arranged in the bottom cap 25. A part of the plate closure 9 and the cap nut 17 is showed in the upper part of the nursing bottle 1.

Figure 14:
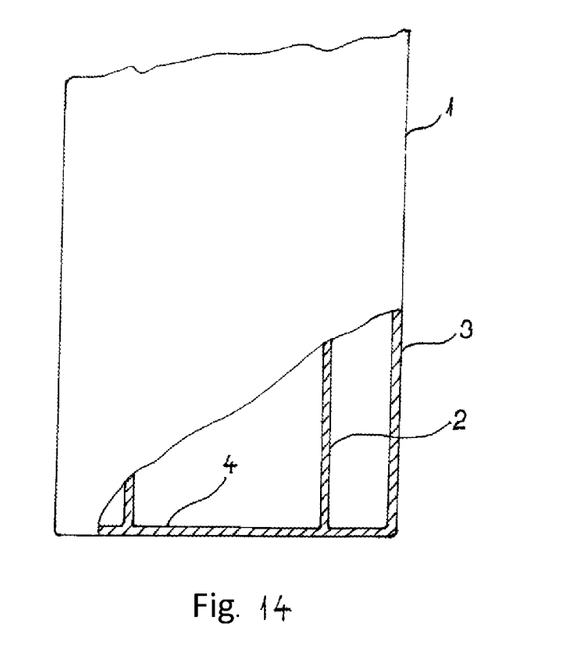
FIG. 14 shows a part of an exemplary nursing bottle with the partition in the shape of a hollow roll, partially in cross-section.

The nursing bottle 1 in FIG. 14 has the partition 2 made in the hollow roll shape arranged coaxially with the casing 2, while the bottom 4 of the nursing bottle 1 makes up one unit with the partition 2.

Containers made according to the technical solution may be used especially in the cases when more types of substances, both of liquid and powder-form, such as for example various types of liquid or instant drinks, are required to be mutually separated, kept and carried (if need be) in one container, or when it is necessary to warm at least one type of liquid up to a required temperature in a required place and at a required time, independently of whether there is a heat supply source available.

This container solution based on the invention is suitable for example for nursing bottles, flasks and other portable bottles designed to be used in the army, for backpackers, fire-brigades, rescue units, etc.

LIST OF THE REFERENCE MARKS

1 Nursing bottle
2 Partition
3 Casing
4 Bottom
5 Inner space
6 Compartment
7 Neck
8 Mounting system
9 Plate closure
10 Circumferential groove
11 Sealing disc
12 Cylindrical superstructure
13 Bottom surface of the dummy collar
14 Dummy
15 Removable cap
16 Bottom mounting system
17 Cap nut
18 Screwed joint
19 Hole
20 Protective cover
21 Bearing disc
22 Electric heater
23 Switchgear
24 Electric accumulator
25 Bottom cap
26 Bottom screwed joint
27 Longitudinal dimple
28 Temperature detector
29 Digital temperature indicator
30 Arresting projection
31 Arresting dimple
37 Secondary mounting system
38 Electric plug

What is claimed is:

1. A container for liquids, comprising:
at least one inlet/outlet hole;
a removable cap fitted on the inlet/outlet hole; and
a container body comprising (i) at least one inner space determined by a casing of the container, (ii) at least one heater arranged inside the container that is connected to a power supply source, and (iii) at least one partition dividing the inner space of the container to at least two mutually separated compartments connected to the at least one inlet/outlet hole, and wherein the heater is arranged inside the container to directly heat a liquid held in one of the at least two mutually separated compartments and indirectly heat or not heat a liquid held in other of the at least two mutually separated compartments.

2. The container of claim 1, wherein the at least one heater comprises an electric heater fitted with a disconnectable electric power supply.

3. The container of claim 2, wherein the electric supply source comprises an electric accumulator connected to a charging device, wherein a switch is arranged in a circuit between the electric accumulator and the electric heater.

4. The container of claim 1 wherein at least one compartment is fitted with at least one temperature detector installed in the space of the compartment.

5. The container of claim 1, wherein at least one partition separates at least two compartments of the container in a watertight manner, and the cap of at least one inlet/outlet hole is watertight.

6. The container of claim 1, wherein the partition comprises a planar surface configured to (i) abut an inner surface of the casing or (ii) fit within grooves made in the inner surface of the casing.

7. The container of claim 6 wherein the partition has a plate form.

8. The container of claim 6 wherein a cross-cut of the partition has a V-shape.

9. The container of claim 6, wherein a cross-cut of the partition has a Y-shape.

10. The container of claim 1, wherein the partition has the form of a hollow roll arranged inside the container, the external diameter of the hollow roll being smaller than the inner diameter of the casing of the container.

11. The container of claim 10, wherein a bottom portion of the hollow roll (i) contacts an inside surface of the casing of the container or (ii) interconnects with a groove in the inside surface of the casing of the container.

12. The container of claim 1, wherein the removable cap is connected to the container by a screw joint.

13. The container of claim 12, wherein the screw joint comprises threaded surfaces on the removable cap and the inlet/outlet hole.

14. The container of claim 1, wherein a plate closure abuts a top surface of the inlet/outlet hole, the plate closure including at least one hole located above at least one compartment, the hole being semi-circular in shape the and comprising lateral sides which form an angle less than 180°, and the plate closure forming a sealing disc rotatable in a plane abutting the top surface on the inlet/outlet hole and being fitted with at least one hole overlapping, at least partially closing the inlet/outlet hole.

15. The container of claim 14, wherein the plate closure includes a dimple having a groove that fits into the upper part of the partition in a watertight manner.

16. The container of claim 14, wherein the removable cap comprises a cap nut with a female thread engaged with a thread made on an abutting top peripheral surface of the container.

17. The container of claim 14 wherein an internal wall of the removable cap and an abutting part of the plate closure and/or sealing disc are fitted with at least one arresting projection and dimple that mutually fit into one another.

18. The container of claim 1, wherein the heater is connected with a bearing disc that is made of electrically insulating material, wherein on one side the bearing disc tightly abuts on the inlet/outlet hole of the container and the opposite side has two electric contacts, having the form of two flat, concentric rings, the electric contacts are connectable to lead-in wires of the heater and are in an electric contact with an electric power source installed in the removable cap.

19. The container of claim 1, wherein the container is made of at least one type of the materials belonging to the material groups represented by glass, metal and plastic or, a plied combination of at least two such materials.

20. The container of claim 1, wherein a thermostat is installed in at least one compartment and is interconnected with the electric switch of the electricity power supplied to the heater.

* * * * *